(12) United States Patent
Wu

(10) Patent No.: US 7,437,870 B2
(45) Date of Patent: Oct. 21, 2008

(54) CHAIN LINK PLATE WITH HIGH STRENGTH

(75) Inventor: Daniel Wu, Tainan (TW)

(73) Assignee: KMC Chain Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 11/656,718

(22) Filed: Jan. 23, 2007

(65) Prior Publication Data

US 2007/0180808 A1   Aug. 9, 2007

(30) Foreign Application Priority Data

Feb. 9, 2006   (TW) .............................. 95202289 U

(51) Int. Cl.
*F16G 13/02* (2006.01)

(52) U.S. Cl. .......................... 59/4; 59/5; 59/8; 474/206; 474/209; 474/212

(58) Field of Classification Search ........................ 59/4, 59/5, 8, 9, 78; 474/155, 206, 209, 212
See application file for complete search history.

(56) References Cited

U.S. PATENT DOCUMENTS

| | | | | |
|---|---|---|---|---|
| 1,899,948 A | * | 3/1933 | Fahrenwald | ...................... 59/5 |
| 4,265,134 A | * | 5/1981 | Dupoyet | ........................... 59/8 |
| 5,203,745 A | * | 4/1993 | Wang | .......................... 474/206 |
| 5,322,483 A | * | 6/1994 | Wang | .......................... 474/212 |
| RE34,688 E | * | 8/1994 | Lapeyre | ...................... 198/834 |
| 5,346,006 A | * | 9/1994 | Wu | .............................. 474/206 |
| 6,308,510 B1 | * | 10/2001 | Christmas | ...................... 59/78 |
| 6,652,402 B2 | * | 11/2003 | Poiret et al. | .................. 474/156 |
| 7,325,391 B1 | * | 2/2008 | Oishi et al. | ........................ 59/5 |
| 2005/0020394 A1 | * | 1/2005 | Valle | ............................ 474/155 |

* cited by examiner

*Primary Examiner*—David B Jones
(74) *Attorney, Agent, or Firm*—Frommer Lawrence & Haug LLP; Ronald R. Santucci

(57) ABSTRACT

A chain link plate includes an elliptical plate body having opposite first and second surfaces, and two mounting holes spaced apart from each other in a longitudinal direction of the plate body and extending from the first surface to the second surface. The plate body has a central longitudinal line that passes through centers of the mounting holes, and two transverse lines that pass respectively through the centers of the mounting holes and that are perpendicular to the central longitudinal line. The plate body has an intermediate juncture portion defined between the transverse lines, and opposite end portions integrally and respectively connected to opposite ends of the intermediate juncture portion. The intermediate juncture portion has a largest width greater than that of each of the end portions.

8 Claims, 3 Drawing Sheets

CHAIN LINK PLATE WITH HIGH STRENGTH

CROSS-REFERENCE TO RELATED APPLICATION

This application claims priority of Taiwanese Application No. 095202289, filed on Feb. 9, 2006.

BACKGROUND OF THE INVENTION

1. Field of the Invention

The invention relates to chains, more particularly to a chain link plate with high strength.

2. Description of the Related Art

Conventional chains are composed of inner chain link plates, outer chain link plates, rollers and connecting pins. Each of the inner and outer chain link plates generally has a narrowed waist portion interconnecting integrally enlarged opposite end portions and having a width smaller than that of each end portion. Each end portion is formed with a through hole. In such a configuration, the chain link plates have inferior strength.

SUMMARY OF THE INVENTION

Therefore, the object of the present invention is to provide a chain link plate having high strength.

According to the present invention, a chain link plate comprises:

an elliptical plate body having opposite first and second surfaces, and two mounting holes spaced apart from each other in a longitudinal direction of the plate body and extending from the first surface to the second surface, the plate body having a central longitudinal line that passes through centers of the mounting holes, and two transverse lines that pass respectively through the centers of the mounting holes and that are perpendicular to the central longitudinal line, the plate body having an intermediate juncture portion defined between the transverse lines, and opposite end portions integrally and respectively connected to opposite ends of the intermediate juncture portion, the intermediate juncture portion having a largest width greater than that of each of the end portions.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
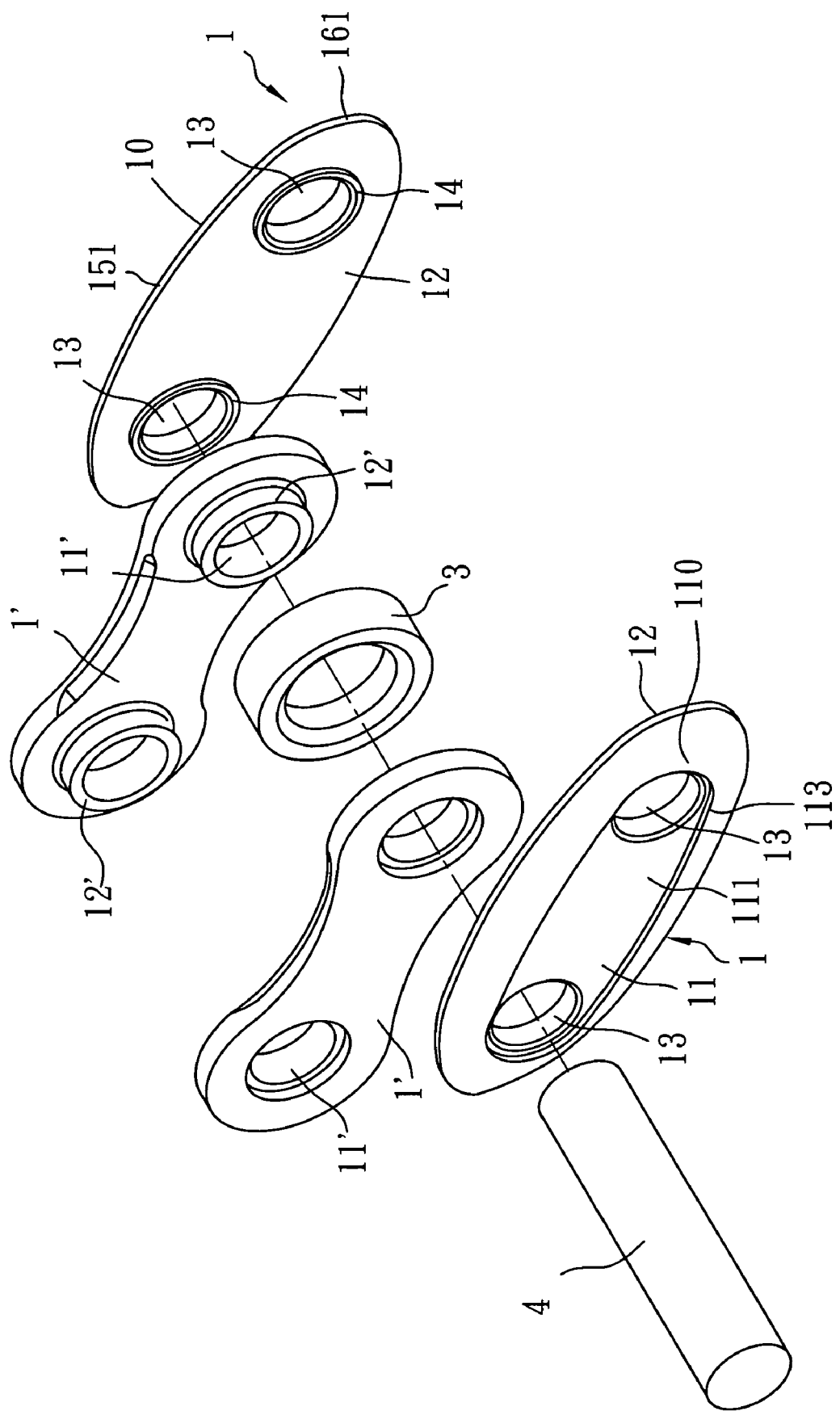
FIG. 1 is an exploded perspective view of a chain unit illustrating the connection between the preferred embodiment of a chain link plate according to the invention and other elements of the chain unit.
Figure 2:
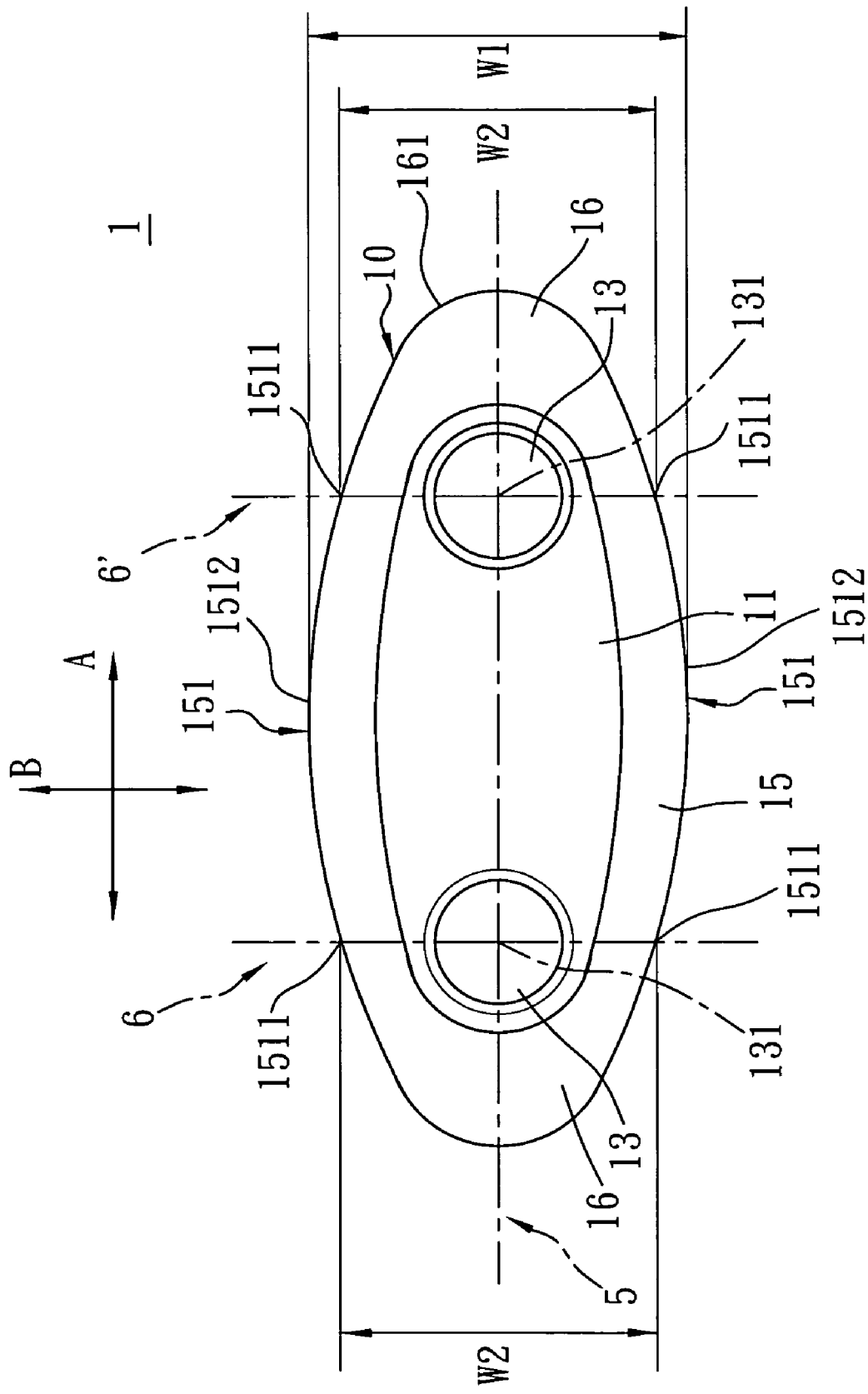
FIG. 2 is a schematic view of the preferred embodiment.
Figure 3:
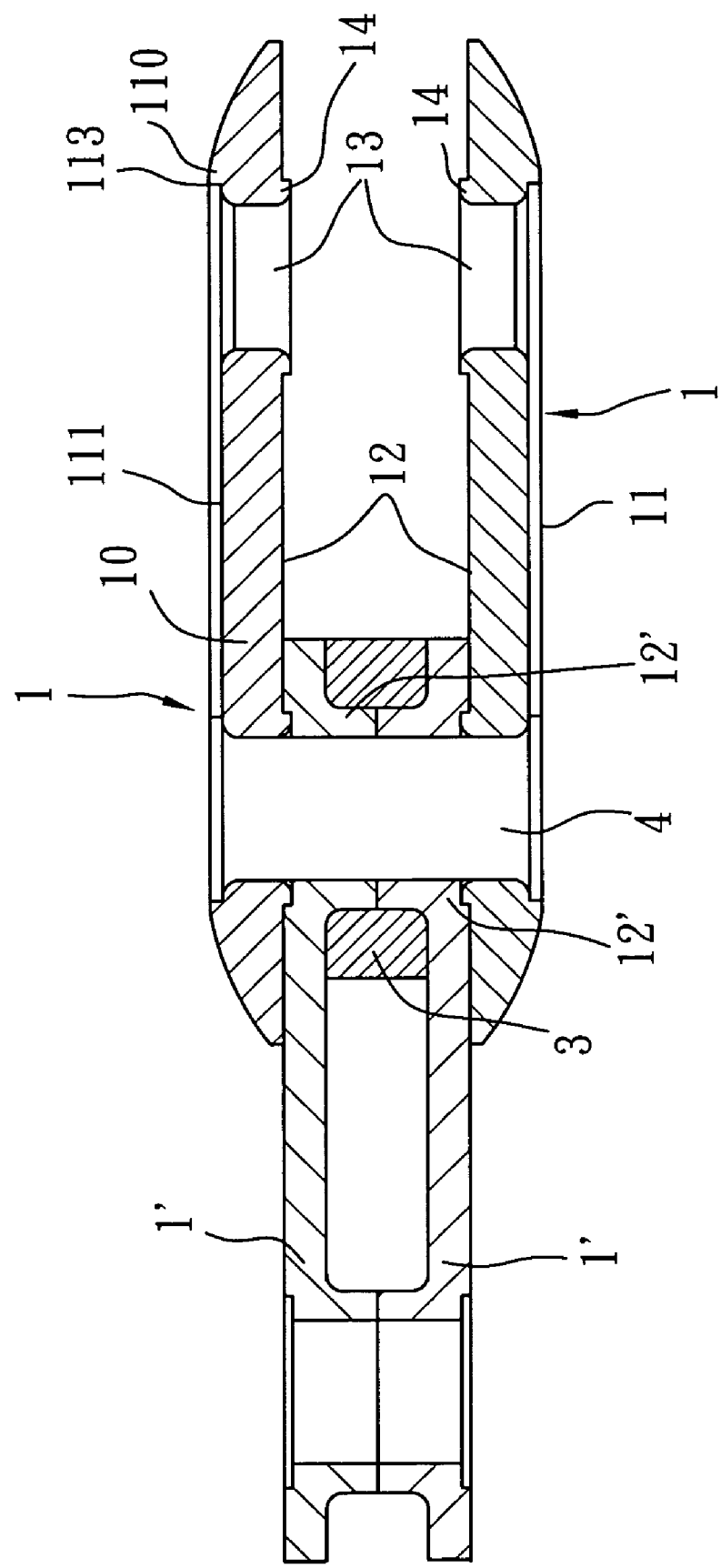
FIG. 3 is a schematic sectional view of the chain unit of FIG. 1.

Referring to FIGS. 1 to 3, the preferred embodiment of a chain link plate 1 according to the present invention is shown to be an element of a chain unit. The chain unit is composed of a pair of the chain link plates 1 serving as outer chain link plates, a pair of inner chain link plates 1', a connecting pin 4 and a roller 3. The inner chain link plates 1' are disposed to face each other. Each inner chain link plate 1' is formed with two through holes 11' spaced apart from each other, and has two annular rings 12' that extend toward the other inner chain link plate 1' and that define respectively peripheries of the through holes 11'. The roller 3 is disposed between the inner chain link plates 1' and are sleeved on two corresponding ones of the annular rings 12' of the inner chain link plates 1'. The connecting pin 4 is inserted through the roller 3, two corresponding ones of the through holes 11' in the inner chain link plates 1' and the corresponding rings 12' such that opposite ends of the connecting pin 4 extend outwardly of the inner chain link plates 1', respectively. As shown in FIG. 2, each chain link plate 1 includes an elliptical plate body 10 that has opposite first and second surfaces 11, 12, and two mounting holes 13 spaced apart from each other in a longitudinal direction (A) of the plate body 10 and extending from the first surface 11 to the second surface 12. The plate body 10 of each chain link plate 1 has a central longitudinal line 5 that passes through centers 131 of the mounting holes 13, and two transverse lines 6, 6' that pass respectively through the centers 131 of the mounting holes 13 and that are perpendicular to the central longitudinal line 5. The plate body 10 of each chain link plate 1 has an intermediate juncture portion 15 defined between the transverse lines 6, 6', and opposite end portions 16 integrally and respectively connected to opposite ends of the intermediate juncture portion 15. In this embodiment, for each chain link plate 1, the intermediate juncture portion 15 of the plate body 10 has two side surfaces 151 opposite to each other in a transverse direction (B) of the plate body 10 and disposed between the transverse lines 6, 6'. Each of the side surfaces 151 has two ends 1511 and a middle portion 1512. The side surfaces 151 are spaced apart from each other by a transverse distance that increases gradually from the ends 1511 to the middle portion 1512. As such, the intermediate juncture portion 15 of the plate body 10 has a largest width (W1) greater than a largest width (W2) of each end portion 16 of the plate body 10.

In this embodiment, each chain link plate 1 further includes an annular surrounding protrusion 110 that is connected integrally to the first surface 11 of the plate body 10 and that is adjacent to a periphery of the plate body 10 such that the first surface 11 of the plate body 10 has an elliptical inner recess area 111 that is defined by the surrounding protrusion 110 and that is formed with the mounting holes 13, as shown in FIGS. 1 and 3. Furthermore, the second surface 12 of the plate body 10 of each chain link plate 1 is generally flat. Each chain link plate 1 has a thickness that reduces gradually from an inner periphery 113 of the surrounding protrusion 110 to the periphery of the plate body 10. Each chain link plate 1 further includes two circular flanges 14 that extend integrally from the second surface 12 of the plate body 10 and that define respectively peripheries of the mounting holes 13 in the plate body 10, as shown in FIGS. 1 and 3.

In this embodiment, an assembly of the inner chain link plates 1' and the roller 3 is disposed between the chain link plates 1. The ends of the connecting pin 4 extend respectively through two corresponding ones of the mounting holes 13 in the chain link plates 1, and are connected respectively and fixedly to the chain link plates 1, as shown in FIG. 3.

In such a configuration, since each chain link plate 1 of this invention has the widened intermediate juncture portion 15 and the surrounding protrusion 110, the chain link plates 1 have relatively high strength as compared to the aforesaid prior art.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A chain link plate comprising:
an elliptical plate body having opposite first and second surfaces, and two mounting holes spaced apart from each other in a longitudinal direction of said plate body and extending from said first surface to said second surface, said plate body having a central longitudinal line that passes through centers of said mounting holes, and two transverse lines that pass respectively through said centers of said mounting holes and that are perpendicular to said central longitudinal line, said plate body having an intermediate juncture portion defined between said transverse lines, and opposite end portions integrally and respectively connected to opposite ends of said intermediate juncture portion, said intermediate juncture portion having a larger width greater than that of said end portions;
wherein said intermediate juncture portion has two side surfaces opposite to each other in a transverse direction of said plate body and disposed between said transverse lines, each of said side surfaces having two ends and a middle portion, said side surfaces being spaced apart from each other by a transverse distance that increases gradually from said ends to said middle portions.

2. The chain link plate as claimed in claim 1, further comprising an annular surrounding protrusion that is connected integrally to said first surface of said plate body and that is adjacent to a periphery of said plate body such that said first surface of said plate body has an elliptical inner recess area that is defined by said surrounding protrusion and that is formed with said mounting holes.

3. The chain link plate as claimed in claim 2, wherein said second surface of said plate body is generally flat, said chain link plate having a thickness that reduces gradually from an inner periphery of said surrounding protrusion to said periphery of said plate body.

4. The chain link plate as claimed in claim 1, further comprising two circular flanges that extend integrally from said second surface of said plate body and that define respectively peripheries of said mounting holes in said plate body.

5. A chain link plate comprising:
an elliptical plate body having opposite first and second surfaces, and two mounting holes spaced apart from each other in a longitudinal direction of said plate body and extending from said first surface to said second surface, said plate body having a central longitudinal line that passes through centers of said mounting holes, and two transverse lines that pass respectively through said centers of said mounting holes and that are perpendicular to said central longitudinal line, said plate body having an intermediate juncture portion defined between said transverse lines, and opposite end portions integrally and respectively connected to opposite ends of said intermediate juncture portion, said intermediate juncture portion having a larger width greater than that of said end portions; and
an annular surrounding protrusion that is connected integrally to said first surface of said plate body and that is adjacent to a periphery of said plate body such that said first surface of said plate body has an elliptical inner recess area that is defined by said surrounding protrusion and that is formed with said mounting holes.

6. The chain link plate as claimed in claim 5, wherein said second surface of said plate body is generally flat, said chain link plate having a thickness that reduces gradually from an inner periphery of said surrounding protrusion to said periphery of said plate body.

7. The chain link plate as claimed in claim 5, further comprising two circular flanges that extend integrally from said second surface of said plate body and that define respectively peripheries of said mounting holes in said plate body.

8. A chain link plate comprising:
an elliptical plate body having opposite first and second surfaces, and two mounting holes spaced apart from each other in a longitudinal direction of said plate body and extending from said first surface to said second surface, said plate body having a central longitudinal line that passes through centers of said mounting holes, and two transverse lines that pass respectively through said centers of said mounting holes and that are perpendicular to said central longitudinal line, said plate body having an intermediate juncture portion defined between said transverse lines, and opposite end portions integrally and respectively connected to opposite ends of said intermediate juncture portion, said intermediate juncture portion having a larger width greater than that of said end portions; and
two circular flanges that extend integrally from said second surface of said plate body and that define respectively peripheries of said mounting holes in said plate body.

* * * * *